United States Patent Office

3,551,371
Patented Dec. 29, 1970

3,551,371
COATING COMPOSITIONS CONTAINING MODIFIED ROSIN FOR IMPARTING STRIPPABILITY
Herman F. Weindel, Uniondale, N.Y., assignor to Mobil Oil Corporation, a corporation of New York
No Drawing. Filed Aug. 28, 1967, Ser. No. 663,485
Int. Cl. C09j 3/26
U.S. Cl. 260—27
12 Claims

ABSTRACT OF THE DISCLOSURE

Strippable coating compositions are provided comprising petroleum wax; primary fatty amide; a copolymer selected from the group consiting of copolymers of ethylene and vinyl acetate and copolymers of ethylene and ethyl acrylate; mineral oil; and a modified rosin.

(1) Field of invention

This invention relates to coating compositions and, in one of its aspects, relates more particularly to improved coating compositions which afford protection during storage, shipment and handling of various articles and which can easily be stripped off when the article is ready for use.

(2) Description of the prior art

Prior to the present invention, strippable coating compositions have been used for affording temporary protection during storage, shipment or handling of various articles, such as drill bits, cutting tools, gears, precision metal bar and flat stock, lathe tools, replacement automotive windshields and other articles of commerce for which temporary protection of metal and other surfaces, prior to use, is desired. The protection sought is generally for the purpose of preventing damage to such surfaces as cutting edges, prevention of rust or corrosion formation on metals, or for eliminating breakage and marring of fragile materials such as the aforementioned automotive windshields and similar articles. At the time the protected article is ready for use, the coating is stripped off and discarded.

Various materials are presently being used as strippable coatings. Among those in commercial use are polymeric materials which, generally, are highly pasticized. Thus, for example, ethyl cellulose plasticized with other conventional type plasticizers or hydrocarbon oils is widely used. Application of such protective coatings is generally obtained by dipping the article to be protected into a bath of the molten coating material. While such materials have been found to provide a fair degree of rust and mar protection, the high percentage of plasticizer employed results in leaving a visible oily film on the article to be protected after the protective coating has been stripped therefrom. Such oily film or other residue is in many instances considered highly objectionable. Furthermore, other limitations exist with respect to such coatings which seriously limit their use. Thus, it is found that the inherent high viscosity of these coating requires relatively high application temperatures (such as 300° F. or higher), thereby resulting in excessive shrinkage upon cooling, shortened pot life and poor control of film thickness. The spraying, roll coating or curtain coating of sheet or roll-stock has also been found, in general to be difficult because of the aforemention relatively high viscosity.

Prior to the present invention, attempts have been made to employ wax-based hot melts as strippable coatings. For the most part, the prior art disclosing wax-based strippable coatings is concerned with blends of petroleum wax and copolymers, such as etheylene and vinyl acetate, with the inclusion of a stable release agent. These coatings, however, are generally more concerned with the need for improving adhesion of the wax coating rather than in their use for being easily removed as strippable coatings. Thus, prior to the present invention, a wax-based strippable coating having a commercially acceptable balance of properties of flexibility, release, viscosity, economy of manufacturing cost, and which leave no visible residue, has not been attained.

SUMMARY OF THE INVENTION

It has now been found, as more fully hereinafter described, that an improved coating composition comprising a unique combination of components resulting in a wax-based hot melt suitable for use as a strippable coating can now be obtained. These coatings provide good flexibility resulting in film continuity around sharp contours. Good strippability, furthermore, is achieved by controlled adhesion, flexibilty and tensile strength. The use of these coatings results in the absence of any visible film or residue on the article to be protected, after stripping. These coatings may be applied by spraying, roll coating, and curtain coating as well as by conventional dipping processes. In addition, the manufacture of such improved strippable coating compositions can be obtained at a compartively low cost.

In accordance with the present invention, the aforementioned improved strippable coating compositions comprise, in general, a petroleum wax; a primary fatty amide; a copolymer selected from the group consisting of copolymers of ethylene and vinyl acetate and copolymers of ethylene and ethyl acrylate; mineral oil; and a modified rosin. More specifically, in accordance with the present invention, the components of the coating are generally present in such preferred amounts that the petroleum wax component is present in an amount from about 25 to about 45 percent, by weight; the primary fatty amide is present in an amount from about 1 to about 5 percent, by weight; the copolymer is present in an amount from about 20 to about 30 percent, by weight; the mineral oil is present in an amount from about 1 to about 5 percent, by weight; and the modified rosin is present in an amount from about 30 to about 50 perecnt, by weight.

Insofar as the petroleum wax component is concerned, a wide variety of waxes of this type can be employed in the coating compositions of the present invention. In general, however, the paraffin waxes are preferred and represent the waxy constituents which are normally found in crude petroleum fractions. These waxes exhibit melting points within the range from about 115° F. to about 165° F. Fully refined paraffin and itermediate waxes having melting points within the range from about 135° F. to about 165° F. are generally preferred. Also contemplated for use in the novel coating compositions of the present invention are the partially refined paraffins and intermediates within the same melting point range, provided that their oil content contribution does not exceed the aforementioned limitations for the overall blend. Where such waxes are employed, the quantity of added mineral oil to the blend is proportionately reduced or eliminated. In this respect, it is also found that high melting point microwaxes and soft laminating grade microwaxes are not satisfactory as substitutes for the aforementioned paraffin and intermediate waxes in the novel coating compositions.

The primary fatty amide employed in the coating compositions of the present invention for imparting the desired degree of stippability, may comprise any amide, either saturated or unsaturated, preferably having a chain length of from about 16 to about 24 carbon atoms. Preferred examples of such amides include erucamide, oleylamide, palmitamide, steramide, behenamide and others.

The copolymers employed in the coating compositions of the present invention may comprise, as previously indicated, copolymers of ethylene and vinyl acetate or copolymers of ethylene and ethyl acrylate, or mixtures of such copolymers. Preferred copolymers include those containing from about 75 to about 65 percent, by weight, of ethylene and from about 25 to about 35 percent, by weight, of vinyl acetate; copolymers containing from about 82 to about 65 percent, by weight, ethylene and from about 18 to about 35 percent, by weight, of ethyl acrylate, or mixtures of such copolymers. Of particular preference are copolymers of ethylene and vinyl acetate having a melt index within the range of from about 15 to about 200 and in which the vinyl acetate is present in an amount, by weight, from about 25 to about 30 percent. Within this range, ethylene-vinyl acetate copolymers having a melt index of about 150 and containing about 28 percent, by weight, of vinyl acetate, are particularly preferred. Another type of preferred copolymers are those comprising ethylene and ethyl acrylate having a melt index within the range from about 5 to about 200 and in which the ethyl acrylate is present in an amount from about 20 to about 30 percent, by weight. Within this range ethylene-ethyl acrylate copolymers having a melt index of about 6 and containing about 20 percent, by weight, of ethyl acrylate are particularly preferred.

The mineral oil component of the coating compositions of the present invention, which together with the aforementioned primary fatty amide, imparts strippability properties to the composition, may comprise any conventional mineral oil. Particularly preferred are those mineral oils having a viscosity between about 50 and about 200 SUS at 210° F. The term, "mineral oil," as used herein, is intended to include not only mineral oils which are conventionally available, as such, but also any oily portion of a wax phase in which the oil falls within the above-described viscosity limits.

The modified rosin component of the coating composition is preferably selected from the group consisting of polymerized rosins, hydrogenated rosins, heat-treated tall oil rosins, disproportionated rosins, and limed rosins. Of particular efficacy are the heat-treated tall oil rosins which are the rosins obtained from tall oil refining operations, during which practically all of the fatty acids also present in the tall oil are removed by fractional distillation, or other procedures. These tall oil rosins are low in fatty acid content and are marketed under the trade name, Starex and Solwyte. In general, the preferred modified rosins contemplated for use in the coating compositions of the present invention possess softening points within the range from about 65° C. to about 120° C.

Examples of particularly satisfactory coating compositions, possessing the aforementioned properties of good strippability, are those which comprise paraffin wax having a melting point of about 150° F. in an amount of about 35 percent, by weight; erucamide in an amount of about 2 percent, by weight; about 22 percent, by weight, of a copolymer containing about 72 percent, by weight, of ethylene and about 28 percent, by weight, of vinyl acetate and having a melt index within the range from about 15 to about 200, or about 22 percent, by weight, of a copolymer containing about 80 percent, by weight, of ethylene and about 20 percent, by weight, of ethyl acrylate and having a melt index within the range of from about 5 to about 200; mineral oil having a viscosity between about 50 and about 200 SUS at 210° F. in an amount of about 1 percent, by weight; and a heat-treated tall oil rosin in an amount of about 40 percent, by weight.

DESCRIPTION OF SPECIFIC EMBODIMENTS

The coating compositions of the present invention and evalutaion thereof with respect to strippable characteristics are illustrated in the examples and corresponding data of the following table (with the relative amounts of components expressed in percent by weight), and in which various blends were prepared and compared with respect to the aforementioned characteristics. After the hot melt blend had been formulated by heating and melting the wax and then blending in the various indicated components, the individual blends were subjected to an evaluation test which comprised momentarily dipping into the respective blends commercially available, high speed steel thread taps (5/16"–18 NC size) followed by withdrawing the tap and allowing it to cool. The coating temperatures were maintained within the range of about 200–230° F., which resulted in a coating thickness of several mills. The individual coated taps were then aged for 60 days at a temperature of 70° F. and a relative humidity of 50 percent. Thereafter, the individual coatings were rated visually for film continuity before stripping, ease of stripping, and the residue on the tap after stripping.

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Ethylene-vinyl acetate copolymer (72/28%) Melt index 150 (Elvax 220) [1] | 22 | 25 | 50 | | | 22 | 22 | 22 | 22 | 50 | |
| Ethylene-vinyl acetate copolymer (72/28%) Melt index 2 (Elvax 260) [1] | | | | 25 | | | | | | | |
| Ethylene-vin 1 acetate copolymer (80/20%) Melt index 150 (Elvax 420) [1] | | | | | 25 | | | | | | |
| Ethylene-ethyl acrylate copolymer (80/20%) Melt index 6 | | | | | | | | | | | 22 |
| Heat-treated tall oil modified rosin (Solwyte) Softening point (R & B) 69° C | 40 | | | | 40 | 40 | 40 | 40 | 40 | | 40 |
| Polyterpene resin (Nirez 1115) [2] Softening point (R & B) 115° C | | | | | | | | | | | |
| Erucamide | 2 | 2 | 2 | 2 | 2 | | 2 | | 2 | | 4 |
| Mineral oil (100 SUS) | 1 | 1 | 1 | 1 | 1 | 1 | | | 1 | | 4 |
| Amine derivative of alkenylsuccinic anhydride (Santolube 70) [3] | | | | | | | | | 1 | | |
| Paraffin wax (150 AMP) | 35 | 72 | 47 | 72 | 32 | 37 | 36 | 38 | 34 | 45 | 30 |
| Monoglyceride of hydrogenated lard (Myverol 1800) [4] | | | | | | | | | | 5 | |
| Film continuity before stripping | (5) | (5) | (5) | (5) | (6) | (5) | (5) | (5) | (5) | (5) | (5) |
| Ease of stripping | (5) | (7) | (7) | (7) | (5) | (5) | (5) | (8) | (5) | (8) | (5) |
| Residue after stripping | (5) | (9) | (9) | (9) | (8) | (9) | (9) | (9) | (5) | (10) | (5) |

[1] Made by E. I. du Pont de Nemours.
[2] Made by Newport Division, Heyden Chemical Corporation.
[3] Made by Monsanto Company.
[4] Made by Distillation Products, Inc., Division of Eastman Kokad Co.
[5] Satisfactory.
[6] Cracked.
[7] Poor.
[8] Borderline.
[9] Heavy.
[10] Moderate.

As will be seen from the data of the examples of the foregoing table, Example 1 illustrates the satisfactory performance that is obtained with respect to the aforementioned properties of film continuity before stripping, ease of stripping and the residue remaining after stripping, where the coating composition comprises the above-described specified wax, amide, copolymer, mineral oil and modified rosin components, each employed within the aforementioned critical limits. The necessity for employing the modified rosin is illustrated by Examples 2, 3 and 4 in which blends were prepared having no rosin component incorporated therein. From these examples it will be apparent that the exclusion of the modified rosin component results in poor ease of stripping and the formation of undesirable amounts of residue after stripping. In example 5 is illustrated the need for employing a copolymer in which the monomeric components are present within the above-described required limits. Thus, it will be apparent that where Elvax 420 was employed, in which the vinyl acetate was present in an amount of 20 percent, by weight (thus being below the above-described critical weight range of 25–35 percent for this monomer), film continuity was seriously impaired by reason of cracking, and a quite unsatisfactory residue remained after stripping. In Example 6 is illustrated the need for the presence of the above-described amide component in which it is shown that, due to the absence of this component, a heavy residue remained after stripping. In Example 7 is illustrated the need for the above-described mineral oil component in which it is shown that, due to the absence of this component, a heavy residue also remained after stripping. Example 8 further exemplifies the need for having both the amide and the mineral oil components present and, as the example discloses, the absence of both of these components correspondingly results in a heavy residue remaining after stripping as well as the borderline value with respect to the ease of stripping. Example 9 clearly indicates a satisfactory performance of the coating composition in which the aforementioned required components are present and within the critical limits set forth; furthermore, this example illustrates the satisfactory performance that can be obtained employing the aforementioned required components of the blend in which other additives can also be incorporated in minor amount, such as a rust inhibitor (Santolube 70). Example 10 is included for comparative purposes as typical of prior art wax based strippable coatings in which only an ethylene-vinyl acetate copolymer, paraffin wax and a monoglyceride of hydrogenated lard are employed. From this example it will be seen that such prior art compositions exhibit a relatively inferior degree of ease of stripping and residue after stripping when employed as coating compositions. Example 11 serves to illustrate the satisfactory performance obtained in employing coating compositions containing the aforementioned critical blend components and within the amounts prescribed, and differs only to the extent of showing that an ethylene-ethyl acrylate copolymer can be satisfactorily employed in addition to the ethylene-vinyl acetate copolymer incorporated in the blends of the aforementioned indicated examples.

It will be understood that still other adjuvants can be included in the coating compositions of the present invention for the purpose of imparting their expected properties without detracting from the properties achieved with the aforementioned basic critical components that are required. Such other materials may include wax-soluble antioxidants and rust inhibitors, as well as other related materials, as those skilled in the art will readily appreciate. Furthermore, although the compositions of this invention have been described as particularly well adapted for strippable coatings in affording temporary protection for various types of materials and metal surfaces, it will be understood that they are also suitable for a wide varity of other uses, as those skilled in the art will readily appreciate. While the invention has been described with reference to preferred compositions and components therefor, it will also be understood that departure from the preferred embodiments can be made within the scope of the invention.

I claim:
1. A coating composition comprising petroleum wax; a primary fatty amide having a chain length of from about 16 to about 24 carbon atoms; at least one copolymer selected from the group consisting of copolymers of ethylene and vinyl acetate, having from about 75 to about 65 percent, by weight, ethylene and from about 25 to about 35 percent, by weight, vinyl acetate and copolymers of ethylene and ethyl acrylate having from about 82 to about 65 percent, by weight, ethylene and from about 18 to about 35 percent, by weight, ethyl acrylate, said copolymers having a melt index within the range from about 5 to about 200; mineral oil; and a modified rosin.

2. A composition as defined in claim 1 wherein the petroleum wax is present in an amount from about 25 to about 45 percent, by weight; the primary fatty amide is present in an amount from about 1 to about 5 percent, by weight; the copolymer is present in an amount from about 20 to about 30 percent, by weight; the mineral oil is present in an amount from about 1 to about 5 percent, by weight; and the modified rosin is present in an amount from about 30 to about 50 percent, by weight.

3. A composition as defined by claim 1 wherein the petroleum wax comprises a paraffin wax.

4. A composition as defined by claim 1 wherein the petroleum wax comprises a paraffin wax having a melting point from about 135° F. to about 165° F.

5. A composition as defined by claim 1 wherein the primary fatty amide is erucamide.

6. A composition as defined by claim 1 wherein the primary fatty amide is oleylamide.

7. A composition as defined by claim 1 wherein the primary fatty amide is palmitamide.

8. A composition as defined by claim 1 wherein the primary fatty amide is stearamide.

9. A composition as defined by claim 1 wherein the modified rosin is a tall oil rosin.

10. A composition as defined by claim 1 wherein the modified rosin is selected from the group consisting of polymerized rosins, hydrogenated rosins, heat-treated tall oil rosins, disproportionated rosins and limed rosins.

11. A composition as defined by claim 1 comprising paraffin wax having a melting point of about 150° F. in an amount of about 35 percent, by weight; erucamide in an amount of about 2 percent, by weight; about 22 percent, by weight, of a copolymer containing about 72 percent, by weight, of ethylene and about 28 percent, by weight, of vinyl acetate and having a melt index within the range of from about 15 to about 200; mineral oil having a viscosity between about 50 and 200 SUS at 210° F. in an amount of about 1 percent, by weight; and a heat-treated tall oil rosin in an amount of about 40 percent, by weight.

12. A composition as defined by claim 1 comprising paraffin wax having a melting point of about 150° F. in an amount of about 35 percent, by weight; erucamide in an amount of about 2 percent, by weight; about 22 percent, by weight, of a copolymer containing about 80 percent, by weight, of ethylene and about 20 percent, by weight, of ethyl acrylate and having a melt index within the range of from about 5 to about 200; mineral oil having a viscosity between about 50 and about 200 SUS at 210° F. in an amount of about 1 percent, by weight; and a heat-treated tall oil rosin in an amount of about 40 percent, by weight.

References Cited

UNITED STATES PATENTS

| 3,058,930 | 10/1962 | Samour | 260—27 |
| 3,326,840 | 6/1967 | Ross et al. | 260—32.6 |
| 3,360,488 | 12/1967 | Hall et al. | 260—23 |
| 3,371,057 | 2/1968 | Gutman | 260—32.6 |
| 3,377,305 | 4/1968 | House | 260—27 |
| 3,207,716 | 9/1965 | Lippoldt | 260—23 |

FOREIGN PATENTS

| 950,406 | 2/1964 | Great Britain | 260—27 |
| 857,507 | 12/1960 | Great Britain | 260—27 |

DONALD E. CZAJA, Primary Examiner

W. E. PARKER, Assistant Examiner

U.S. Cl. X.R.

260—28.5, 32.6, 33.6

PO-1050
(5/69)

UNITED STATES PATENT OFFICE
CERTIFICATE OF CORRECTION

Patent No. 3,551,371  Dated December 29, 1970

Inventor(s) Herman F. Weindel

It is certified that error appears in the above-identified patent and that said Letters Patent are hereby corrected as shown below:

Column 1, line 19, --Background of the Invention-- has been omitted from patent

Column 1, line 47, for "pasticized" read --plasticized--

Column 2, line 51, for "itermediate" read --intermediate--

Column 2, line 67, for "stippability" read --strippability--

Column 2, line 71, for "steramide" read --stearamide--

Table title 3 second word, for "viyl" read --vinyl--

Table title 5 third word, for "rall" read --tall--

Table footnote four, for "Kokad" read --Kodak--

Table column 4 footnote, for "(1)" read --(10)--

Signed and sealed this 23rd day of March 1971.

(SEAL)
Attest:

EDWARD M. FLETCHER, JR.
Attesting Officer

WILLIAM E. SCHUYLER, JR.
Commissioner of Patents